R. BERNAT.
HEAVY MOTOR TRACTOR.
APPLICATION FILED APR. 3, 1918.
1,347,244.
Patented July 20, 1920.
2 SHEETS—SHEET 1.
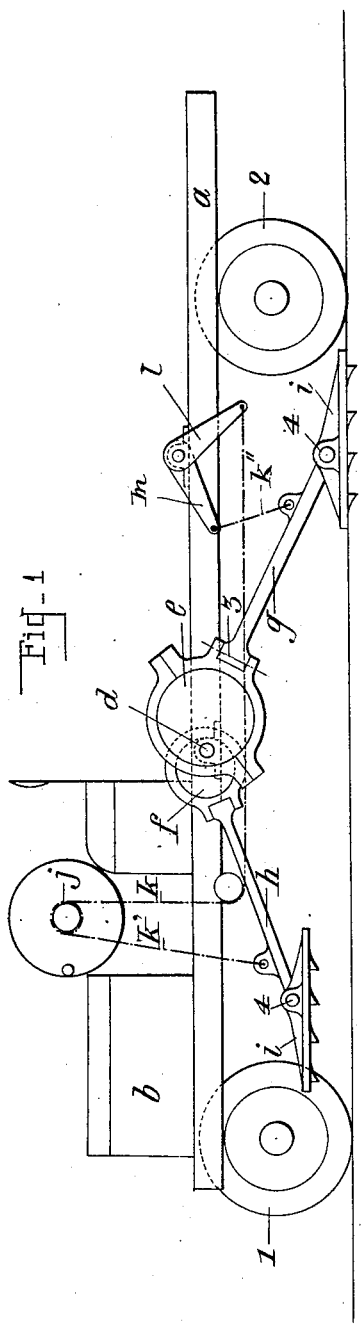
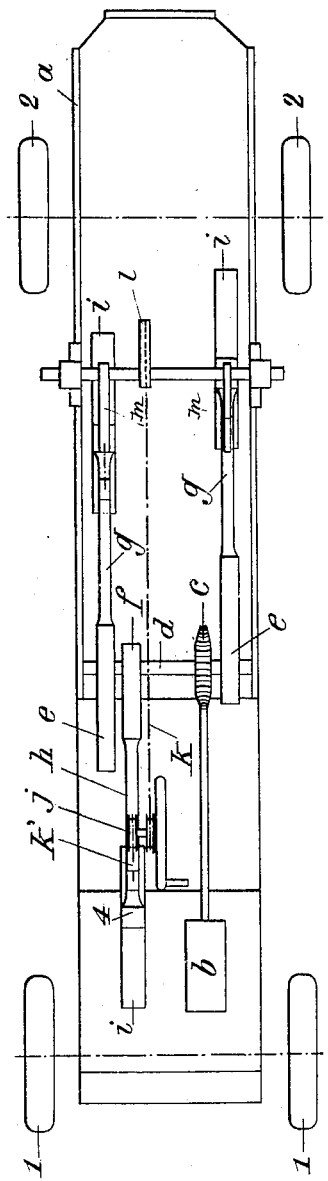
INVENTOR:
RAOUL BERNAT
BY: ATTORNEY R. BERNAT.
HEAVY MOTOR TRACTOR.
APPLICATION FILED APR. 3, 1918.
1,347,244.
Patented July 20, 1920.
2 SHEETS—SHEET 2.
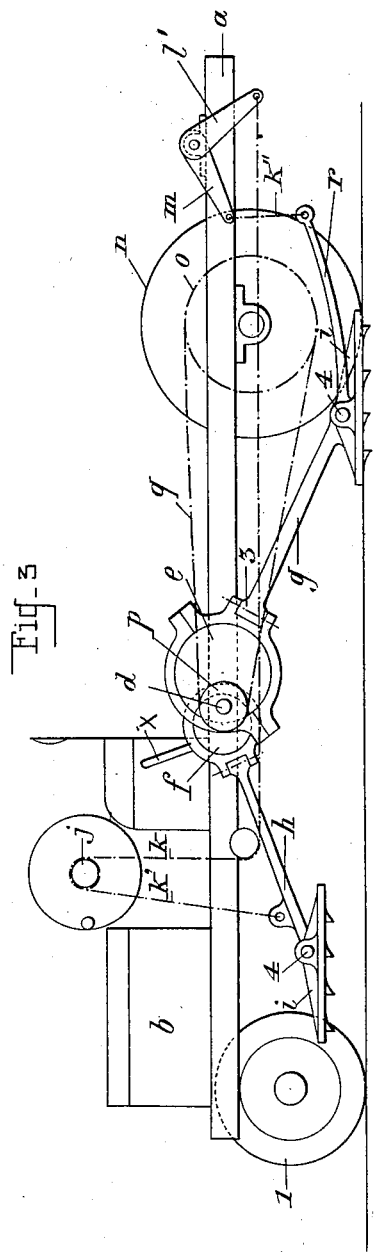
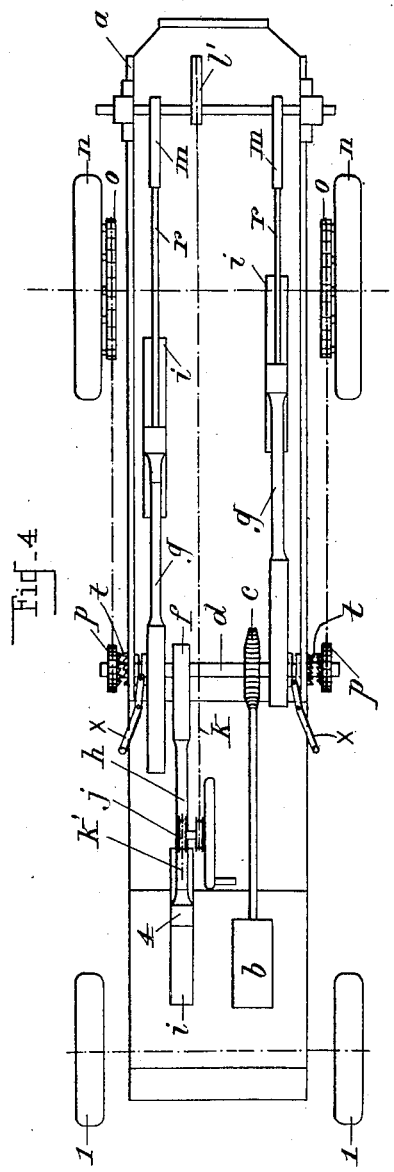
INVENTOR:
RAOUL BERNAT
BY: H van Oldenmul
ATTORNEY.

UNITED STATES PATENT OFFICE.

RAOUL BERNAT, OF BORDEAUX, FRANCE.

HEAVY MOTOR-TRACTOR.

1,347,244.

Specification of Letters Patent. Patented July 20, 1920.

Application filed April 3, 1918. Serial No. 226,542.

*To all whom it may concern:*

Be it known that I, RAOUL BERNAT, a citizen of Republic of France, and residing at Bordeaux, Gironde, 6 Rue des Douves, have invented new and useful Improvements in Heavy Motor-Tractors, of which the following is a specification.

This invention has for its object to provide a heavy tractor of high power, intended for traveling slowly, and adapted to travel over surfaces of almost any kind, even soft or irregular surfaces. Such a tractor should be capable, for example, of being used for the drawing or propulsion of heavily loaded vehicles including artillery wagons and the like, which may have to travel over bad road surfaces or even over fields. Such a tractor should also be capable of being used for drawing agricultural implements such as plows.

The tractor forming the subject of the present invention fulfils these requirements and comprises in combination with a suitable motor, preferably an internal combustion engine, a system of limbs or crutches suitably jointed and having imparted to them alternating backward and forward movements which they transmit to shoes suitably formed for engaging with the road or ground surface in one direction of movement or the other; these limbs and shoes may be thrown out of action whenever desired.

The invention is illustrated by way of example in the accompanying drawings, wherein Figure 1 is a diagrammatic elevation and Fig. 2 a diagrammatic plan view of a tractor constructed according to the invention.

Figs. 3 and 4 represent the same views of a modification of the said tractor.

The tractor comprises in either case a chassis $a$ similar to those of motor cars or wagons, and carrying an internal combustion engine $b$ which is preferably placed at the front. The chassis runs on four wheels, the front wheels 1 being steering wheels of a usual type, while the rear wheels 2 are supporting and running wheels, (Figs. 1 and 2), but the arrangement, as shown in Figs. 3 and 4, is a different one, as will be stated hereafter.

The engine $b$ drives through suitable gearing including a worm drive $c$, a countershaft $d$ on which are keyed, for example, a number of eccentrics or cranks forming two sets $e$ and $f$. The eccentrics of the set $e$ operate the limbs $g$ directed rearwardly of the vehicle, while the eccentrics of the set $f$ operate the forwardly directed limb or limbs $h$.

The limbs are jointed at 3 so as to allow them to turn laterally, and they carry at their ends shoes $i$ provided with ribs or teeth on their under surface, these shoes being made as long as is conveniently possible, and jointed to the limbs at 4 so as to allow of a hinging movement relative thereto.

The eccentrics of each set are keyed at angles of 180°, 120° or 90° apart, according as two, three or four eccentrics, limbs and shoes are provided in each set.

A wheel or winch $j$ operating chains $k$, $k'$ renders it possible to lift either the limbs $g$ or the limbs $h$ into a position such that the one set of shoes may be thrown out of action completely before the other set comes into contact with the ground; the lifting of the limbs may be effected to any required extent during their working. In the example shown the chain $k'$ is connected directly to the front limb $h$ while the chain $k$ transmits its lifting movement to the rear limbs $g$ through a lever $l$ and arms $m$ connected to the limbs by chains $k''$.

The rear lifting chain may be attached either to the bell crank lever $l$, as shown in Fig. 1, or as represented by Figs. 3 and 4, to a crank lever $l'$, that is to say either on the link or limb $g$, between the eccentric and shoe, or upon a suitable extension $r$ of the said limb, behind the articulation point or joint with the shoe.

The lifting winch $j$ may be replaced by a lever working over a notched segment, or any other lifting and lowering mechanism adapted for raising the limbs wholly or partially when required.

The mechanism operates in the following manner:

For forward traveling, when the engine is started, and when the limbs of the set $g$ are lowered while those of the set $h$ are raised as shown in Fig. 1, the rotation of the shaft $d$ with the eccentrics $e$, produces reciprocating movements of the limbs $g$ with their shoes $i$, and these latter effect the forward propulsion of the vehicle.

The speed may be controlled by raising the limbs $g$ wholly or partially so as to render the engagement of the shoes $i$ with the ground more or less effective as required. The duration of contact of each shoe $i$ with the ground is reduced in proportion to the height to which the shoe is raised, and the speed of forward movement of the tractor is reduced in proportion. This result is obtained by hinging the limbs from the chains k, k', which causes the shoes to take a curved path of movement when suspended freely.

The joints 3 of the limbs make it possible for the vehicle to turn laterally, inasmuch as the limbs are free to swing to one side or the other, and during this operation it is preferable to reduce the propelling speed of the tractor.

For traveling backward it is only necessary to lift the set of limbs g and to lower the limbs of the set h by turning the winch j.

In the example shown only two limbs g are seen in the plan view and one limb h, but it will be apparent that the number of limbs in each set may be varied as required.

The eccentric shaft d may obviously be replaced by an equivalent construction such as a crank shaft, but the construction illustrated is preferred as being the simplest and least expensive in practice.

In order to take a curve of a reduced radius, the means represented as a modification in Figs. 3 and 4 may be advantageously used.

To this end, the free running wheels n may be made as driving wheels, by providing them with crown or sprocket wheels o in connection by means of chains q with two other sprocket wheels p which loosely turn upon opposite ends of the shaft d and may be either thrown into or out of gear by means of suitable clutches t mounted on shaft d and controlled by levers or equivalent devices x.

With such a device, as the leading or guide wheels are turned in the proper direction, the curve will be taken either to the right or to the left, depending upon the clutch being in gear with the one or the other of the wheels p.

Having thus described my invention what I claim as new and desire to secure by Letters Patent is:—

1. In a high power tractor, the combination of a chassis having front and rear wheels; a motor mounted on the chassis; two sets of pushing crutches embodying limbs pivotally mounted at their upper ends for lateral swinging movement and shoes pivotally connected to the lower ends of said limbs for vertical swinging movement, one set of crutches for propelling the tractor forwardly and the other set for propelling it rearwardly; mechanism for alternatively lowering or raising either set of crutches toward or from the ground to throw it into or out of action and to control the duration of engagement of the shoes with the ground and, consequently, the direction and speed of the tractor; operating connections between the motor and the crutch sets; driving connections between the motor and the rear wheels; and clutch mechanism operable to throw either driving connection into action to enable the tractor to be turned in either direction.

2. In a high power tractor, the combination of a chassis having front and rear wheels, a motor mounted on the chassis; two sets of pushing crutches embodying limbs pivotally mounted at their upper ends for lateral swinging movement and shoes pivotally connected to the lower ends of said limbs for vertical swinging movement, one set of crutches for propelling the tractor forwardly and the other set for propelling it rearwardly; mechanism for alternately lowering either set of crutches toward the ground to throw it into action and simultaneously raising the other set above the ground to throw it out of action, and for controlling the period of engagement of the shoes of the active set with the ground and, consequently, the direction and speed of the tractor; and operating connections between the motor and the crutch sets.

3. In a high power tractor, the combination of a chassis having front and rear wheels, a motor mounted on the chassis; two sets of pushing crutches embodying limbs pivotally mounted at their upper ends for lateral swinging movement and shoes pivotally connected to the lower ends of said limbs for vertical swinging movement, one set of crutches for propelling the tractor forwardly and the other set for propelling it rearwardly; a winch mounted on the chassis and having operating means connected to it; flexible means carried by the winch and connected at one end with one set of crutches and at the opposite end with the other set for alternatively lowering either set toward the ground to throw it into action and simultaneously raising the other set above the ground to throw it out of action, and for controlling the period of engagement of the shoes of the active set with the ground and, consequently, the direction and speed of the tractor; a device interposed between one of the ends of the flexible element and the adjacent set of crutches consisting of a crank lever to which said end is directly attached, arms connected to move with said lever, and chains connected at opposite ends to said arms and set of crutches; and operating connections between the motor and the crutch sets.

In testimony whereof I have signed my name to this specification in the presence of two subscribing witnesses.

RAOUL BERNAT.

Witnesses:
E. J. BOURGOIN,
JEAN ABADIE.